United States Patent [19]

Chaitin

[11] Patent Number: 4,571,678
[45] Date of Patent: Feb. 18, 1986

[54] REGISTER ALLOCATION AND SPILLING VIA GRAPH COLORING

[75] Inventor: Gregory J. Chaitin, Yorktown Heights, N.Y.

[73] Assignee: International Business Machines Corporation, Armonk, N.Y.

[21] Appl. No.: 439,523

[22] Filed: Nov. 5, 1982

[51] Int. Cl.$^4$ ............................................. G06F 15/20
[52] U.S. Cl. ................................................... 364/300
[58] Field of Search ................. 364/300, 200 MS File

[56] References Cited

U.S. PATENT DOCUMENTS

4,435,753 3/1984 Rizzi ..................................... 364/200

Primary Examiner—Raulfe B. Zache
Attorney, Agent, or Firm—Roy R. Schlemmer

[57] ABSTRACT

In an optimizing compiler which receives a high level source language program and produces machine interpretable instructions, a method for assigning computational data utilized by the program to a limited number of high speed machine registers in a target CPU and more particularly to such a method for determining that there are not enough registers available in the CPU to store all of the data required at the given point in time and for the determining which data should be stored in the system memory until they are actually needed. Said method being further characterized in that method utilizes a graph reduction and coloring approach in making the "spill" decisions.

12 Claims, 4 Drawing Figures

"BASIC REGISTER ALLOCATION PROCESS"

FIG. 4
"SPILLING REGISTERS TO STORAGE"

REGISTER ALLOCATION AND SPILLING VIA GRAPH COLORING

BACKGROUND OF THE INVENTION

1. Field of the Invention

Intensive efforts are being continually made in the field of electronic digital computers to solve the "programming problem." In this area compilers, or more specifically optimizing compilers, are one of the principle tools utilized to on the one hand make the programmer's task easier and on the other to increase the efficiency of operation of the target CPU. For a very complete treatise on the development of compilers and other language processing systems reference is made to an article entitled "The History of Language Processor Technology in IBM," by F. E. Allen in the IBM Journal of Research and Development, Vol. 25, No. 5, Sept. 1981 on pages 535-548.

Such optimizing compilers conventionally utilize optimization algorithms such as:
Common sub-expression elimination
Moving code out of loops
Eliminating dead code
Strength reduction
Register assignment Each of these algorithms transforms an intermediate language (IL) program into a semantically equivalent but more efficient IL program. The purpose of these various algorithms is the same as the purpose of the overall compiler i.e. to facilitate the use of very high level source program languages on the input side and to, hopefully, assure that the object program produced by the compiler will run on the target CPU in the most efficient manner possible.

It will be noted in the above list of optimizing approaches, mention is made of working register assignment for allocation to tasks. This is a very important problem as is well known in the computer arts. This is because operations wherein the operands are obtained from and results return to registers can proceed at a much higher speed than those which require memory or storage accessing.

Most compilers assume an arbitrarily large number of registers during their optimization procedures. In fact the result of each different computation in the program is conventionally assigned a different (symbolic) register. At this point a register allocation procedure must be invoked to assign real registers, from those available in the machine, to these symbolic registers. Conventional approaches use a subset of the real registers for special purposes while the remaining set is assigned locally within the statement, or at best the basic block (e.g. a loop). Between these assignments, results which are to be preserved are temporarily stored, and variables are redundantly reloaded. While these approaches clearly work, they are inefficient in that a significant amount of CPU time is wasted while data is being transferred between storage and registers or conversely, data is accessed from and returned to storage directly bypassing the registers completely.

A novel compiler strategy which was significantly different from conventional compilers was described in the literature and specifically referenced in the prior art section, which observed that the register assignment or allocation problem is equivalent to the graph coloring problem, where each symbolic register is a node and the real registers are different colors. When two symbolic registers have the property that there is at least one point in the program when both their values must be retained, that property is modelled on the graph as a vertex or edge between the two nodes. Thus the register allocation problem is equivalent to the problem of coloring the graph so that no two nodes connected by a vertex are colored the same. This is equivalent to saying that each of these two (or more) nodes must be stored in different registers.

This approach has proven very effective. Experience has shown that many procedures "color" so that no store-load operations are necessary to keep results in storage temporarily.

However, a significant shortcoming of the register allocation via coloring procedure referenced above regards the "spilling" problem or the situation where there are more data items to be retained than there are machine registers available. When a spilling problem was found to exist in the above referenced register allocation process the use of the graph coloring analysis approach was abandoned and other ad hoc solutions to the problem were used. While the results of this approach are reasonably good, it requires large amounts of compile time and accordingly a need was recognized for a better approach to the solution of the spilling problem.

2. Prior Art

An article entitled "Register Allocation Via Coloring," by G. J. Chaitin et al, appearing in Computer Languages, Vol. 6, pages 47-57, Pergamon Press, Great Britain, 1981, referred to above, describes the basic concepts of register allocation via coloring but utilizes an entirely different approach to the "spilling" problem. The present invention constitutes a distinct improvement in the area of spilling to that disclosed in this article.

An article entitled "The 801 Minicomputer," by George Radin, published in the ACM SIGPLAN Notices, Vol. 17, No. 4, Apr. 1982, pages 39-47, is an overview of an experimental minicomputer which incorporated an extremely intelligent optimizing compiler utilizing the concepts of register allocation via coloring described in the above-referenced article and which also incorporates the teachings of the present invention.

For a general description of the optimizing compiler itself, reference is made to an article entitled "An Overview of the PL.8 Compiler," by Auslander and Hopkins appearing in the ACM SIGPLAN Notices, Vol. 17, No. 6, June 1982, pages 22-31. Specific reference is made in this article to the present register allocation procedure.

Two articles (1) J. Cocke and P. W. Markstein, "Measurement of Code Improvement Algorithms," in "Information Processing '80," (edited by S. H. Lavington), pages 221-228, North-Holland, Amsterdam, (1980), and (2) F. E. Allen and J. Cocke, "A Program Data Flow Analysis Procedure," Communications ACM 19, pages 137-147 (1976) discuss the objectives and concepts involved in the design of optimizing compilers and provide excellent background material for an understanding of the design approaches utilized in optimizing compilers in which the present invention would have particular utility.

The present register allocation process for use in an optimizing compiler has previously appeared in print as an IBM Research Report No. RC 9124 which was available Nov. 11, 1981, from the library of the Thomas J. Watson Research Center in Yorktown Heights, New York and also appeared in the SIGPLAN '82 Symposium on Compiler Construction, SIGPLAN Notices, Vol. 17, No. 6, June 1982, pages 98–105.

SUMMARY OF THE INVENTION

A procedure has been found for extending the graph coloring approach so that it will solve the spilling problem during the register allocation phase of the operation of an optimizing compiler. The decisions on when to spill data are now made on the basis of the register conflict graph and cost estimates based on the value of keeping the computational data in a register rather than in storage.

It is accordingly a primary object of the present invention to provide a register allocation procedure particularly adapted for use with an optimizing compiler and which handles the spilling problem with greatly improved efficiency.

It is a further object of the invention to provide such a register allocation procedure which handles the spilling problem utilizing graph coloring techniques.

It is yet another object of the invention to provide such a register allocation procedure which minimizes compile time.

It is yet another object of the invention to provide such a register allocation procedure which produces code comparable with the best hand coding techniques.

The foregoing and other objects, features and advantages of the present invention will be apparent from the subsequent description of a preferred embodiment thereof as set forth in the accompanying specification and drawings.

DESCRIPTION OF THE PREFERRED EMBODIMENT

The objects of the present invention are accomplished in general by an improvement to the register allocation portion of an optimizing compiler which utilizes the concepts of the graph coloring approach described in the present inventor's previously referenced article appearing in "Computer Languages." Utilizing the output of the basic register allocation by coloring graphing technique, the same general graph coloring techniques are applied to the situation where it is found that spill code must be generated to handle the computational data of a given procedure. According to the herein disclosed invention, first a "cost of spilling" computation is made for all nodes of the procedure having a degree greater than the number of machine registers available (N). Based on this computation nodes are consecutively removed from the interference graph in the inverse order of their cost computation and marked as a "spill removal" and subsequent to each spill removal, an attempt is made to further reduce the graph by determining if any of the remaining nodes have a degree less than N and if not consecutive spill removals occur until the graph is finally reduced. At this point spill code is inserted for all "spill removed" nodes and the procedure is reanalyzed from the beginning as an original register allocation procedure.

As stated previously it has been found that this novel technique produces much better object code and takes much less compiler time than the spill procedures set forth and described in said above referenced article. It has been further found that the technique produces object code which is as good as and frequently better than hand coding techniques can produce.

As stated previously, the present spilling procedure was specifically designed to replace the somewhat inefficient spilling procedure utilized in the above referenced article by the present inventor which in turn performs the register allocation function of the optimizing compiler generally described in the article entitled "Measurement of Code Improvement Algorithms," by Cocke et al similarly referenced above. The compiler, in turn, was designed to be utilized in the experimental 32-bit minicomputer described generally in the article "The 801 Minicomputer," by G. Radin referenced above. The design of this experimental minicomputer utilized thirty-two, 32-bit general-purpose registers. The instruction set consists mostly of 3-address register to register operations, each of which executes in a single machine cycle. References to storage are through separate load and store instructions. In order to achieve the high performance goals of this project, it was essential to take advantage of the high-speed registers to keep data there rather than in storage as much as possible, in order to avoid having the very fast CPU waiting for the storage subsystem.

It should be understood however that the present invention has equal applications to other CPU architectures. The above referenced optimizing compiler was also directed to the IBM System 370 Architecture.

It was a principle goal of the overall optimizing compiler project to take as input programming in a very high-level language such as PL/1. It was the further intent of the project to produce object code from the compiler which would be competitive with hand coded assembly language whereby there would no longer be any significant incentive to do programming at the machine language level. The simplicity and regularity of the instruction set of the experimental 801 minicomputer not only enables the CPU to be smaller and faster but also enhances the design of the compiler.

The register allocation phase of the compiler stands between the optimization phase and the final code assembly and emission phase. When the intermediate or internal language (IL) enters register allocation, it is written assuming a hypothetical target machine having an unlimited number of high-speed general-purpose CPU registers. It is the responsibility of the optimization phase to eliminate references to storage by keeping data in these registers as much as possible. It is the responsibility of the register allocation phase to map the unlimited number of symbolic registers assumed during optimization into the 32 registers which are actually present in the CPU. In order to do this, it may be necessary to add code to the program to spill computations from registers to storage and later reload them. This will be referred to as spill code.

It should be noted that a computation as used herein with relation to what must be stored in the registers relates to any data utilized in or resulting from a particular operation. For example, in an add operation there would be three units of data, e.g. the two (or more) items to be added and the result. Operations such as load and store might only have one item of data which would be stored in the registers.

Register allocation consists of the following main parts: usedef chaining (indicating when a value is no longer needed) plus getting the right number of names, building the interference graph, coalescing nodes, attempting to find a 32-coloring of the graph, and if one cannot be found, modifying the program and its graph until a 32-coloring is obtained. Each of these steps will now be briefly described.

The first step in processing the program involves using well-known optimizing compiler techniques to do a global data-flow analysis. Which symbolic registers are live at each point in the IL program must be known. This is done by indicating at the beginning of each basic block which computations are live going into it, and by marking each operand of each instruction in the IL to indicate if it goes dead.

The Intermediate Language (IL) utilized herein refers to a simplified hypothetical machine language. It is well known to use such a language in optimizing compilers. Specific reference to a book which discusses the use of such languages in compilers is "Compiler Construction for Digital Computers," by David Gries, John Wiley, New York, 1971. More specifically, chapter 11 of this book discusses internal forms of the source program.

Next, the register interference graph is built. It contains one node for each symbolic register in the IL. Two nodes are adjacent, that is to say, two symbolic registers conflict or interfere, if they are ever live simultaneously, more precisely, if one of them is live at a definition point of the other. Thus a 32-coloring of the interference graph corresponds to a permissible register allocation, and if the chromatic number of the graph is greater than 32, spill code is necessary.

After the interference graph is built, unnecessary register copy operations are eliminated by coalescing or combining the nodes which are the source and targets of copy operations. Of course, this can only be done if these nodes do not interfere with each other. Once two nodes have been coalesced, they must get the same color and be allocated to the same register, and the copy operation becomes unnecessary. This copy-eliminating optimization is known as subsumption or variable propagation in the optimizing compiler literature.

Next the following seemingly trivial observation is used in order to construct a 32-coloring. Assume it is desired to find a 32-coloring of a graph having a node of degree N less than 32. Then the graph is 32-colorable if and only if the reduced graph from which the node and all its edges have been omitted is 32-colorable. So the algorithm reduces the interference graph by removing all nodes of degree less than 32. This often cascades until the entire graph is eliminated, that is, until the problem of 32-coloring the original graph is reduced to that of 32-coloring the empty graph. Nodes are then added back on in the inverse order that they were removed, and as each node is restored a color is picked for it. Experiments have shown that this procedure produces excellent results. It is easy to see that it can be implemented in such a way that its running time is linear in the size of the graph. Note that the underlying coloring procedure fails only if at some point the reduced graph only has nodes of degree 32 or greater.

What can be done if the procedure is blocked in this way?. If the above procedure fails to produce a 32-coloring, spill code must be added and the interference graph modified until a 32-coloring is obtained. In fact this is essentially done by the same procedure used to obtain 32-colorings. It may be said that the procedure for obtaining 32-colorings will either do so or will modify the program and its graph until it can. If the procedure is blocked because all nodes are of high degree, it will pick a node to delete from the graph in order to unblock things. Deleting this node will hopefully produce a cascade of nodes of degree less than 32 and enable the coloring procedure to finish or at least to advance a considerable distance towards the empty graph. Deleting the node from the graph corresponds to making the decision that the computation which it represents will be spilled, that is, kept in storage rather than in a register. This means that each spill decision implies adding code to the IL to store a spilled computation at each of its definition points and to reload it at each of its use points.

DETAILED DESCRIPTION OF PROCEDURE

The register interference graph is a large and massive data structure, and it is important to represent it in a manner that uses as little storage as possible consistent with the ability to process it at high speed. A dual representation is used: a bit matrix and adjacency vectors.

The bit matrix for an N-node interference graph consists of a symmetric matrix of N bits by N bits. The bit at row I and column J is a 1 if and only if nodes I and J are adjacent. This bit matrix is excellent for random access to the interference graph, but it is quite sparse, and it is too time consuming to use it for sequential access to the graph. Thus it is supplemented by keeping for each node in the graph a vector giving the set of nodes which are adjacent to it. The length of this vector is equal to the degree of the node.

The algorithm for building the interference graph is therefore a two-pass algorithm. In the first pass over the IL the bit matrix is used to calculate the degree of each node. Then the N adjacency vectors are storage allocated, and a second pass is made over the program IL in order to fill in the adjacency vectors. It is believed that this two-pass approach is much better than the one-pass segmented scheme described in the previously referenced "Register Allocation Via Coloring" (RAVC) article; non-segmented adjacency vectors can be processed more simply and quickly.

The present approach to coalescing nodes of the graph in order to eliminate unnecessary register copy operations is also different from that in the RAVC article. As nodes are coalesced the bit matrix is kept current and the adjacency vectors of nodes which have been coalesced are chained together. No attempt to eliminate entries in the adjacency vectors which have become duplicates due to node coalesces is made. The resulting interference graph is therefore not suitable for use by the coloring algorithm, which deduces the degree of a node from the length of its adjacency vector and is disturbed by duplicate entries.

In order to obtain a new interference graph reflecting the coalesces, the program IL is rewritten in terms of coalesced symbolic registers, and the two-pass interference graph building algorithm is re-run on the new and somewhat shorter IL. It may then be possible to eliminate register copy operations that could not previously be eliminated by performing further node coalesces (see RAVC article). Building the graph and coalescing is continued until no more desirable coalesces are found to be possible and the graph is left unspilled by coalescing. In practice two or three iterations have been found to be sufficient.

How spill decisions are made from the interference graph was described briefly above. That description omitted two very important points: which node is chosen to spill when the coloring procedure is blocked, and the fact that the interference graph must be rebuilt after spill code is inserted. The second point will be discussed first.

In order to make spill decisions from the graph, it is important to keep the graph and program in step as spill decisions are made. However this can only be done in an approximate manner. Spilling a computation is not the same as eliminating its node from the graph, for it is still necessary to reload it at each use and to store it away at each definition point. So that what actually ought to happen, usually, is that one node corresponding to a globally live computation would have to be replaced by several new nodes corresponding to computations which are only live momentarily. However it is too expensive to proceed in this more exact manner.

Thus after all spill decisions are made, it is necessary to insert spill code in the program IL, rebuild the interference graph, and then reattempt to obtain a 32-coloring. This will usually succeed, but it is sometimes necessary to loop through this process yet again, adding a little more spill code, until a 32-coloring is finally obtained. In practice the fact that the process of inserting spill code and rebuilding the interference graph must be iterated until a coloring is obtained has not been found to be a problem. Convergence is usually quite rapid, and the compile time is dominated by that required to build the graph the first time—all successive graphs are substantially smaller.

The other point which must be addressed is how to choose a node to spill when the coloring procedure is blocked. Obviously it is desired to insert as little spill code as possible. More precisely, the execution time of the object program should be increased as little as possible.

In order to estimate execution times, it is assumed that all instructions execute in one machine cycle and that each instruction in a loop is executed ten more times than it would be if it were outside the loop.

While making spill decisions, the interference graph is supplemented with a table which gives for each node in the graph an estimate of what it would cost to spill it. Then when the coloring procedure is blocked, it decides to spill that node, among those remaining, for which the cost of spilling it divided by its current degree is as small as possible.

These cost estimates are made as follows. The cost of spilling a node is defined to be the increase in execution time if it is spilled, which is approximately equal to the number of definition points plus the number of uses of that computation, where each definition and use is weighted by its estimated execution frequency. The cost estimates also take into account the fact that some computations can be redone instead of spilling and reloading them, and that if the source or target of a register copy operation is spilled then the copy operation is no longer necessary. In fact spilling a computation that can be recomputed and which is used as the source of a register copy operation can have negative cost!

It should be understood that there are many different criterias for making spill decisions. For example, the basis for determining spill costs can be readily tailored to specific applications; trying to minimize the amount of spill code rather than its execution time, changing the frequency of execution of loops, etc.

Finally, a somewhat subtle point must be mentioned, which gives some local intelligence to the global algorithm. Suppose that there are several uses of a spilled computation within a single basic block. Proceeding naively as outlined above, one would reload it at each use. However, if no computations go dead between the first use and the last use, then one might as well only insert a load before the first use, and keep the computation in that register until the last use. Similarly, if a computation is local to a basic block, and if nothing goes dead between its definition and its last use, then spilling the computation cannot help to make the program colorable. Therefore, the cost of spilling this node is set to infinity. This also keeps the procedure from spilling computations that have already been spilled.

Referring now to FIGS. 1–4, the overall register allocation and the spilling procedures are set forth somewhat more diagrammatically. It should be appreciated that these operations have been previously described in detail and the subsequent program may be referred to for the specific computation steps required in each case. It is believed that the previous verbal description of the procedure together with the flow charts of FIGS. 1–4 would allow any competent programmer to practice the present invention and program same in any well known compiler language in addition to the SETL language used in the program example.

Figure 1:
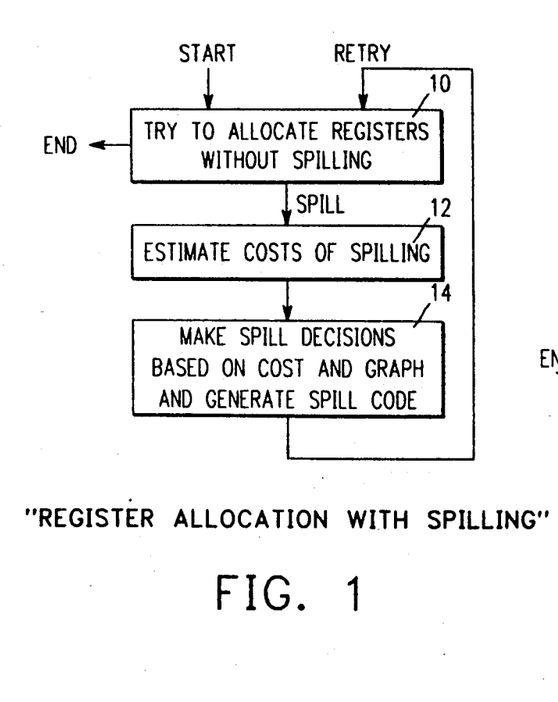
FIG. 1 comprises a high level flow chart of the overall register allocation procedure of the present invention.

Referring first to FIG. 1, a high level flow chart of the overall register allocation procedure is set forth. The compiler would enter the register allocation phase at the arrow marked "start." In block 10 the register allocation procedure via coloring would be attempted as set forth herein and also as set forth in detail in the previously RAVC article and if successful the appropriate intermediate language with appropriate real registers assigned to the various instructions would be produced and the program would exit the procedure via the arrow designated "end."

Assume that there remained certain nodes of degree greater than N which would necessitate going to the "spill" routine, the first step of this procedure is indicated in block 12 wherein the cost of spilling each of the nodes would be calculated. The system then would proceed to block 14 wherein the overall spill processing takes place and each node to be spilled is removed for subsequent spill code generation. The graph reduction processing would be continued until all remaining nodes have been removed either based on normal graph reduction decisions or on spill decisions as set forth previously. Once the requisite spill code has been generated and inserted in the intermediate language the appropriately modified intermediate language is reprocessed back through the register allocation procedure via the "retry" arrow (in block 10). This procedure will iterate until the system branches out of block 10 via the "end" exit point.

Figure 2:
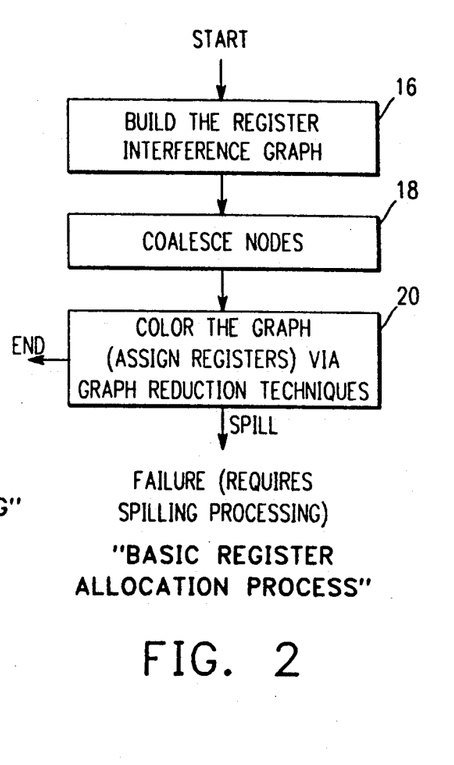
FIG. 2 comprises a high level flow chart of the basic register allocation process (without spilling).

Referring now to FIG. 2 there is indicated a very high level flow chart for the basic register allocation procedure. This overall procedure as indicated previously is set forth generally herein and in more detail in the previously referenced RAVC article.

Block 16 refers to the process of building the register interference graph wherein the complete procedure is graphed and all nodes and edges placed in storage in both matrix form and adjacency list form as described previously. The program then proceeds to block 18, wherein certain nodes susceptible of being coalesced are appropriately combined for the purpose of eliminating unnecessary register copy operations. The procedure then continues to block 20 wherein the graph is reduced to being empty via the previously described graph reduction techniques and then appropriate coloring or register allocation is made to complete the process (if possible). If the graph cannot be reduced the procedure will branch, via the arrow marked "spill" into the spilling procedure.

Figure 3:
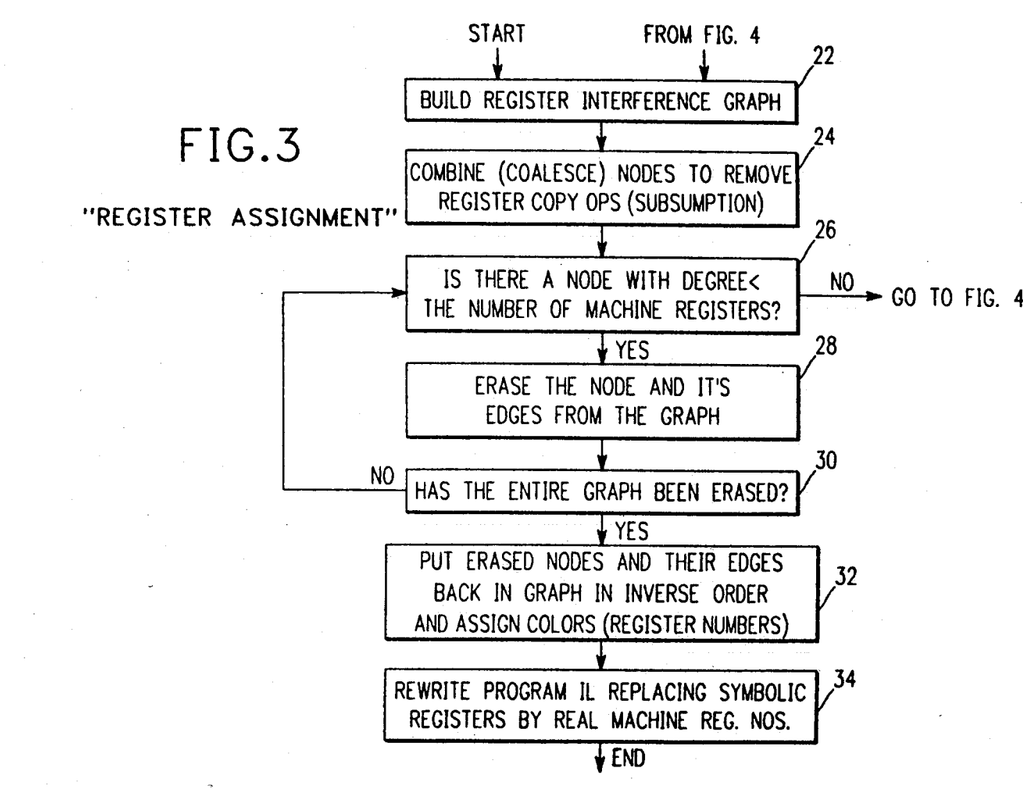
FIG. 3 comprises a detailed flow chart of the register allocation process of FIG. 1.

Referring now to FIG. 3, the basic register allocation process of FIG. 2, is set forth in somewhat more detail. It will first be noted that blocks 22 and 24 are essentially identical to blocks 16 and 18 in FIG. 2, and will not be further described. The remainder of the flow chart including blocks 26–34 are embedded within block 20 of FIG. 2.

Referring first to block 26, a decision is made as to whether or not there is a node remaining in the graph with a degree (G) less than the number of machine registers (N). As will be apparent at this point in the flow chart, it will be noted that on the original entry into block 26 the answer will probably be "yes." If not, the procedure would branch to FIG. 4, via the arrow marked "no." Assuming there is such a node the procedure continues to block 28 wherein the node is erased and together with its edges is removed from the graph, at which point the procedure continues to block 30 wherein a decision is made as to whether or not the entire graph has been erased. If the answer is "no," the procedure returns to block 26, which means some nodes are left in the graph. It then makes a determination as to whether they are of a degree which allows the procedure to loop through blocks 28 and 30, or whether instead the procedure must branch to FIG. 4. Assuming now that the answer to the test made in block 30 is "yes" the system continues to block 32 wherein the procedure in fact rebuilds the graph by replacing nodes in their inverse order and appropriately assigning colors to the various computational data elements where it will be understood that the colors actually are the real register numbers. The procedure then continues to block 34 wherein the complete intermediate language program is rewritten replacing all symbolic register in the input intermediate language program by real machine register numbers and the procedure exits via the other arrow marked "end."

Figure 4:
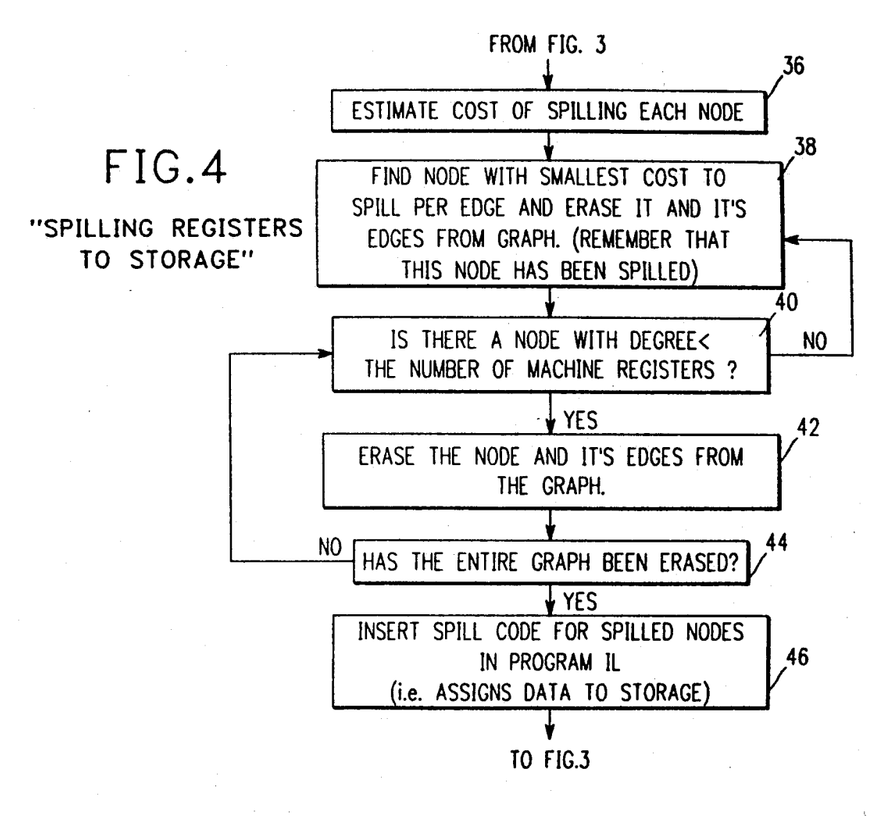
FIG. 4 comprises a detailed flow chart of the herein disclosed process for handling the spilling problem in a global register allocation scheme.

Referring now to FIG. 4, a more detailed sequence of the spilling procedure operations is illustrated. Referring to the FIGURE, block 36 causes the procedure to estimate the overall cost of spilling each node in terms of the total amount of spill code that would have to be written and inserted in the intermediate language in order to effect the total spilling of the node, weighted by its estimated execution frequency. The procedure then goes to block 38 wherein the selection of which node to spill is made based on the cost to spill per edge which in term is obtained by dividing the results obtained for "overall cost" for each node in block 36 by the total number of edges for each node. This implies that even though the total amount of spill code to remove a given node were high, if it also had a large number of edges, it might still be selected for spilling by the routine.

Once the selected node has been removed in block 38, the procedure continues to block 40 which performs a test virtually identical to block 26 of FIG. 3. What this implies is that once a node has been removed by spilling there is a possibility that other nodes which had previously been of too high a degree to remove by ordinary graph reduction techniques may possibly now exist. In block 40, this test is made, and if such nodes exist they are removed in block 42. This block, as will be appreciated, is virtually identical to block 28 in FIG. 3. Block 44 is similarly equivalent to block 30 and if at this point any nodes remain in the graph the procedure branches back to block 40. The possibility exists here of proceeding again thru block 40 or to instead branch back to block 38 where the next spill node is chosen and removed. This process continues until an affirmative decision is made in block 44. It will be noted at this point that all of the nodes in the graph will have either been removed via non-spill decisions vis-a-vis FIG. 3 (standard graph reduction) or spill decisions vis-a-vis FIG. 4. As will be apparent, appropriate records are kept by the procedure identifying those nodes for which spill code must actually be inserted to produce a new intermediate language version of the procedure in block 46.

At this point the procedure exists from block 46 and returns to block 22 in FIG. 3 wherein a whole new register interference graph is built utilizing the newly generated intermediate language from block 46 wherein a number of symbolic registers have been removed from the intermediate language and are assigned to storage rather than to symbolic registers.

Also as stated previously it is hoped at this point that the complete register allocation process via coloring can proceed to a successful conclusion without spilling again. However, it is possible for the reasons stated previously that one or two iterations of the overall process may be required before the final register allocation is possible. In any event, the extra allocation procedure will proceed as set forth in FIGS. 3 and 4, until a final exit from the program via block 34 is accomplished.

SPECIFIC "REGISTER ALLOCATION WITH SPILLING" PROGRAM

The following program is written in a high level language well known in the compiler arts as SETL; however, for a discussion and description of its use, reference is hereby made to a book entitled *Higher Level Programming: Introduction to the Use of the Set-Theoretic Programming Language SETL*, by R. B. K. Dewar, E. Schonberg and J. T. Schwartz, available as bound lecture notes of the Courant Institute of New York University, 1981.

This program written in the SETL language comprises in compiler interpretable form the "register allocation with spilling procedure," set forth and described herein.

```
program register_allocation;
```

DECLARATION STATEMENT
{ var il; $ il is an ordered sequence of instructions

```
                    $   Each instruction is a triple (opcode,def,use),
                    $     where opcode is a character string,
                    $     & 'bb', 'copy', 'spill', and 'reload'
                    $     have special meanings.
                    $   Def is a tuple of outputs, each a pair (reg,dead), where
                    $     reg is a symbolic register and dead is a true/false value
                    $     indicating whether or not reg goes dead.
COMMENTS            $   Use is a tuple of inputs, each a pair (reg,dead), where
                    $     reg is a symbolic register and dead is a true/false value
                    $     indicating whether or not reg goes dead.

$   Basic block header pseudo-ops:
                    $   'bb' has def for each symbolic register live at entry to the basic block.
                    $   'bb' has as use the estimated execution frequency of the basic block
                    $     (floating point number).

var graph;    $ register interference graph = set of edges,
DECLARATION                         $ each edge being specified by the set of its endpoints
                      var colors;   $ set of available colors (machine registers)
STATEMENTS            var cost;     $ gives estimated cost of spilling each symbolic register
                      var spilled;  $ set of spilled symbolic registers
```

```
        read( il );
        read( colors );
        if color_il() = Ω then
          estimate_spill_costs;
A         decide_spills;
          insert_spill_code;
          color_il;
        end if;
        print( il );

proc color_il; $ build graph, coalesce, & color
          build_graph;
          coalesce_nodes;
          coloring := color_graph( graph, registers_in_il() );
B         if coloring = Ω then return Ω; end if;
          rewrite_il( coloring );
          return( coloring );
        end proc color_il;

proc build_graph; $ build the register interference graph
          graph := { };
          (for [ opcode, def, use ] ∈ il)
            if opcode = 'bb' then
              liveness := { };
              (for [ reg, dead ] ∈ def | not dead)
                liveness(reg) := liveness(reg) ? 0 + 1;
              end for;
            else
              (for [ reg, dead ] ∈ use | dead)
C               liveness(reg) -:= 1;
                if liveness(reg) = 0 then liveness(reg) := Ω; end if;
              end for;

(for[ reg, dead ] ∈ def)
                graph +:= { { reg, x }
                  :x ∈ domain liveness | x ≠ reg };
                if not dead then
                  liveness(reg) := liveness(reg) ? 0 + 1;
                end if;
              end for;
            end if;
          end for;
        end proc build_graph;

proc coalesce_nodes; $ coalesce away copy operations
          (while   [ opcode, def, use ] ∈ il
           | opcode = 'copy'
           and ( source := use(1)(1) ) ≠ ( target := def(1)(1) )
           and { source, target }    graph)
D           f := { [ source, target ] };
            graph := { { f(x) ? x : x ∈ edge } : edge ∈ graph };
            rewrite_il( f );
          end while;
        end proc coalesce_nodes;

proc color_graph(g,n); $ color the graph with edges g & nodes n
          if n = { } then return { }; end if;
          if not    node ∈ n | # neighbors(node,g) < # colors
```

```
                    then return Ω; end if;
                    coloring := color_graph( { edge ε g | node    edge },
E                      n - { node } );
                    if coloring = Ω then return Ω; end if;
                    coloring(node) :=
                    arb( colors - { coloring(x) : x ε neighbors(node,g) } );
                    return coloring;
                  end proc color_graph;

proc estimate_spill_costs; $ estimate cost of spilling each register
                    cost := { };
                    (for [ opcode, def, use ] ε il)
                     if opcode = 'bb' then
                       frequency := use(1)(1);
                     else
F                      (for [ reg, —] ε def + use)
                         cost(reg) := cost(reg) ? 0 + frequency;
                       end for;
                     end if;
                    end for;
                  end proc estimate_spill_costs;

proc decide_spills; $ make spill decisions
                    g := graph;
                    n := registers_in_il();
                    spilled := { };
                    (while n ≠ { })
                     if not   node ε n | # neighbors(node,g) < # colors then
                       node :=
G                      arb { x ε n | cost(x) = min/ { cost(y): y ε n } };
                       spilled +:= { node };
                     end if;
                     g := { edge ε g | node    edge };
                     n -:= { node };
                    end while;
                  end proc decide_spills;

proc insert_spill_code; $ insert spill & reload instructions in il
                    newil := [ ];
                    (for [ opcode, def, use ] ε il)
                     if opcode = 'bb' then
                       newil +:= [['bb',
                        [[reg,dead] ε def | reg    spilled],use]];
                     else
                       before := after := newdef := newuse := [ ];
                       (for [ reg, dead ] ε use)
                         if reg ε spilled then
                           newuse +:= [[ (newreg:=newat), true ]];
                           before +:= [['reload',[[newreg,false]],[]]];
                         else
                           newuse +:= [[ reg, dead ]];
H                        end if;
                       end for;

(for [ reg, dead ] ε def)
                         if reg ε spilled then
                           newdef +:= [[ (newreg:=newat), false ]];
                           after +:= [['spill',[],[[newreg,true]]]];
                         else
                           newdef +:= [[ reg, dead ]];
                         end if;
                       end for;
                       newil +:= before + [[opcode,newdef,newuse]] + after;
                     end if;
                    end for;
                    il := newil;
                  end proc insert_spill_code;

proc rewrite_il(f); $ apply function f to each register in il
                    il := [[ opcode,
                      [[ f(reg) ? reg, dead ] : [ reg, dead ] ε def ],
I                     [[ f(reg) ? reg, dead ] : [ reg, dead ] ε use ]
                      ]
                     :[ opcode, def, use ] ε il ];
                  end proc rewrite_il;

proc registers_in_il; $ returns set of symbolic registers in il
                    return
J                   { reg : [reg,—] ε [] +/ [ def+use : [—,def,use] ε il ]
                     | (type reg) ≠ 'REAL' };
```

-continued

```
        end proc registers_in_il;

⎛   proc neighbors(x,g); $ x is node, g is set of edges
K   ⎜     return { y ε {}+/g | {x,y} ε g };
    ⎝   end proc neighbors;
      end program register_allocation;
```

The following table illustrates the correlation between the flow charts of FIGS. 1-4, with the various procedures contained in the above program. It should be understood however that the correlation is approximate and that some procedures may overlap slightly into other boxes as will be apparent to those skilled in the art. The reference to the program is contained in the braces and letters appearing in the left hand column of the program itself. The first section entitled "Comments" is in essence a series of comments explaining the precise format of the input to this procedure. The second entitled "Declaration Statements," defines certain terms utilized in the program.

Procedures J and K are small subroutines which perform the stated functions.

It will be noted at this point that the various procedures and subprocedures are defined by A-K and these relate to the flow chart as indicated in the table.

TABLE 1

| Program Procedures | Blocks in Flow Charts |
| --- | --- |
| A | All of FIG. 1 |
| B | All of FIG. 2 |
| C | 22 |
| D | 24 |
| E | 26-32 |
| F | 36 |
| G | 38-44 |
| H | 46 |
| I | 34 |
| J | Used in B |
| K | Used in E and G |

The following PL/I program illustrates the intermediate language (IL) used during the present register allocation procedure. The primary advantage is that it allows the procedure to quickly loop through all the registers in an instruction, and that it can be quickly rewritten to reflect register renamings. Also note that multiple results are permitted, as well as an unlimited number of input operands. The particular IL output is the result of procedure I in the previously specified program. It should also be noted that while this particular language is disclosed in the nature of a preferred embodiment, others skilled in the art might wish to use somewhat different intermediate languages. In the listing it will be noted that in the column to the right of the listing, English language statements surrounded by /* and */ are comments explaining what each statement means. This is for instructional purposes only.

```
register_rename; proc(eq);
  dcl
    eq(*)          fixed bin,         /* map from old to new register names */
    x              offset(il),        /* x points to current instruction */
    i              fixed bin,         /* i points to current operand */
    il             area(*) ctl ext,   /* intermediate language for proc */
    proc_begin     offset(il) ext,    /* offset in il of beginning of proc */
    1 instruction  based(x),          /* current instruction in il for proc */
    2 next_instruction offset(il),    /* forward chain */
    2 last_instruction offset(il),    /* backward chain */
    2 source_statement fixed bin,     /* for listings & tracebacks */
    2 opcode       fixed bin,         /* & pseudo-ops like label definition */
    2 defs         fixed bin,         /* index of last output operand */
    2 uses         fixed bin,         /* index of last input operand */
    2 kills        fixed bin,         /* index of last operand destroyed */
    2 operand(i refer(kills)),        /* def's, then use's, then kill's */
      3 register      fixed bin(31),  /* or integer value or dictionary ref */
      3 operand_type  fixed bin,      /* see list of types below */
      3 dead          bit,            /* operand's value is no longer alive */
  /* operand types:*/
    o_null         fixed bin ext,     /* no operand in this position */
    o_symreg       fixed bin ext,     /* symbolic register (computation) */
    o_dictref      fixed bin ext,     /* dictionary reference (storage) */
    o_integer      fixed bin ext;     /* immediate value (displacement etc) */
  do x = proc_begin repeat            /* look at each instruction */
       next_instruction
     until( next_instruction = proc_begin );
    do i = 1 to kills;                /* look at each operand */
      if operand_type(i) = o_symreg then   /* if it is a register, */
        register(i) = eq(register(i));     /* then rename it */
    end;
  end;
end register_rename;
```

As will be apparent from the above description of the present invention, including the detailed program listings, the herein disclosed "register allocation with spilling" procedure is both unique and very straightforward. It is further stated, based on many experimental uses of the program, that extremely good register allocation results have been obtained. Further, the procedure is fully automatic and can be utilized with the above referenced compiler or with virtually any other optimizing compiler with equally good results. It is of course to be understood that the particular optimizing compiler must produce an intermediate language input capable of being processed by the register allocation procedure, and which takes full advantage of an unlimited number of symbolic registers to remember quantities rather than recompute them. Also the final register allocation produced by the program is believed to be sufficiently good to obviate hand coding for this task.

Although the herein disclosed embodiment is the preferred one known to the inventor at the present time, it will of course be understood that various changes of the overall flow process may be readily made by those skilled in the art without departing from the spirit and scope of the present invention as set forth in the following claims.

Having thus described my invention, what I claim as new, and desire to secure by Letters Patent is:

1. In an optimizing compiler for converting a high level source language program into a machine executable program, the improvement which comprises a register allocation procedure which receives as input an intermediate language specifying storage requirements for the program as an unlimited number of symbolic registers and which produces a modified intermediate language for the program wherein all symbolic register assignments are converted to real machine registers or storage designations, said procedure comprising the steps of:
   generating an interference graph for said program,
   allocating registers to said program via graph reduction and graph coloring techniques without spilling,
   when it is determined that further graph reduction is blocked and that spilling must occur, removing any remaining nodes in the interference graph by either making a spill determination or by further graph reduction steps until the graph is completely reduced,
   generating spill code for those nodes removed on the basis of spill determinations, and
   assigning registers to the nodes of said reduced graph by graph coloring techniques.

2. A register allocation procedure as set forth in claim 1, including removing those nodes during graph reduction steps which are defined as having a degree $G<N$ wherein N is the number of machine registers available in the target CPU for the storage of computational data elements and wherein nodes having a degree $G \geq N$ can only be removed as spill candidates.

3. A register allocation procedure as set forth in claim 2, including determining the cost of spilling the nodes remaining in the graph after it has been determined that spilling must occur and consecutively removing nodes which must be spilled on a cost per edge basis.

4. A register allocation procedure as set forth in claim 3, including rewriting the intermediate language program with spill code replacing all symbolic registers representing nodes removed by said spill decisions and using this rewritten intermediate language program as a next input to said complete register allocation procedure, and repeating said procedure until it is determined that the particular version of the intermediate language is colorable via graph coloring techniques without further spill processing.

5. In an optimizing compiler for converting a high level source language program into a machine executable program, the improvement which comprises a register allocation procedure which receives as input an intermediate language specifying storage requirements for the program as an unlimited number (K) of symbolic registers and which produces a modified intermediate language for the program wherein all symbolic register assignments are converted to real machine registers or storage designations, said procedure comprising the steps of:
   generating an interference graph for a K-node program which comprises constructing a symmetrical bit matrix in storage for the program which has a dimension of K bits by K bits wherein the bit at row I and column J is a "1" if and only if nodes I and J are adjacent (must be live concurrently) calculating the degree of each node from said matrix,
   creating a table of K adjacency vectors for said nodes,
   said procedure further including coalescing nodes which comprise copy operations,
   keeping said matrix current and chaining together adjacency vectors of nodes which have been coalesced,
   rewriting the intermediate language program in terms of the coalesced nodes of the interference graph and
   rerunning the new intermediate language program as a new input to the overall graph coloring procedure, and assigning real register numbers to said nodes by graph coloring techniques.

6. A register allocation procedure as set forth in claim 5 including removing nodes from said graph by graph reduction techniques until the graph is completely reduced.

7. A register allocation procedure as set forth in claim 6 including initiating a spilling procedure when further graph reduction is blocked by nodes having too high a degree which procedure includes removing any remaining nodes in the interference graph by making spill determinations or by further graph reduction steps, when possible, until the graph is completely reduced,
   modifying the current intermediate language program by generating spill code for those nodes removed on the basis of spill determinations and assigning registers by graph coloring techniques to all nodes of said graph which were removed by permissible graph reduction techniques.

8. A register allocation procedure as set forth in claim 7, including removing nodes during graph reduction steps which are defined as those having a degree $G<N$ wherein N is the number of machine registers available in the target CPU for the storage of computations and wherein nodes having a degree $G \geq N$ can only be removed as spill candidates.

9. A register allocation procedure as set forth in claim 8, including determining the cost of spilling all nodes remaining in the graph after it has been determined that spilling must occur and sequentially removing nodes which must be spilled based on such cost determinations.

10. A register allocation procedure as set forth in claim 9, including rewriting the intermediate language program with spill code replacing all symbolic registers representing nodes removed by said spill determinations and using the rewritten intermediate language program as a next input to said overall register allocation procedure and repeating said procedure until it is determined that the particular version of the intermediate language is colorable via graph coloring techniques without further spill processing.

11. In an optimizing compiler for converting a high level source language program into a machine executable program, the improvement which comprises a register allocation procedure which receives as input an intermediate language specifying storage requirements for the program as an unlimited number of symbolic registers and which produces a modified intermediate language for the program wherein all symbolic registers assignments are converted into real machine registers or storage designations, said procedure comprising the steps of:

generating an interference graph for said program, combining nodes of said graph to remove the register copy operations, rebuilding said graph to reflect said node removal, determining if there is a node with a degree G less than the number of machine registers N available, and if such a node is present, removing the node and its edges from the graph, determining if all nodes of the graph have been removed and if not, returning to said node removal step, if all nodes have been removed rebuilding the graph a node at a time together with the respective edges in the inverse order of their removal and assigning register numbers to the nodes, rewriting the complete program intermediate language replacing symbolic registers by real machine register numbers at which point the procedure is exited, upon a determination that a node remains in the graph during the node determined step of a degree G equal to or greater than N branching to a spilling procedure which comprises making a weighted spill cost per node determination for each remaining node, consecutively removing nodes as spill candidates based on said spill cost determination and after each spill removal, determining if any of the remaining nodes can be removed by normal graph reduction techniques and if not removing a further node as spill candidates until all of the nodes have been removed from the graph by either graph reduction or as spill candidates, determining after each node removal if all nodes have been removed and after a positive determination is made, inserting spill code in the intermediate language for all nodes removed as spill candidates and utilizing the rewritten intermediate language with the spill code inserted as a new intermediate language input to the overall register procedure and repeating said procedure until it is ascertained that complete register coloring is possible without the necessity of initiating a spill procedure.

12. A register allocation procedure as set forth in claim 11, wherein the step of determining the cost of spilling a node comprises determining said cost per edge and wherein nodes are spilled consecutively with increasing costs per edge.

* * * * *